US009180648B2

(12) United States Patent
Fukatani et al.

(10) Patent No.: US 9,180,648 B2
(45) **Date of Patent: *Nov. 10, 2015**

(54) LAMINATE FOR LAMINATED GLASS

(75) Inventors: Juichi Fukatani, Shiga (JP); Izumi Omoto, Shiga (JP); Seiko Ichikawa, Shiga (JP); Kouichi Tanaka, Tokyo (JP); Mayu Kameda, Tokyo (JP)

(73) Assignees: SEKISUI CHEMICAL CO., LTD., Osaka (JP); NIPPON KAYAKU KABUSHIKI KAISHA, Tokyo (JP); POLATECHNO CO., LTD., Niigata (JP)

( * ) Notice: Subject to any disclaimer, the term of this patent is extended or adjusted under 35 U.S.C. 154(b) by 209 days.

This patent is subject to a terminal disclaimer.

(21) Appl. No.: 13/139,576

(22) PCT Filed: Dec. 22, 2009

(86) PCT No.: PCT/JP2009/071270

§ 371 (c)(1),
(2), (4) Date: Aug. 3, 2011

(87) PCT Pub. No.: WO2010/074048

PCT Pub. Date: Jul. 1, 2010

(65) Prior Publication Data

US 2011/0293857 A1 Dec. 1, 2011

(30) Foreign Application Priority Data

Dec. 22, 2008 (JP) ................................ 2008-326169

(51) Int. Cl.

| | |
|---|---|
| ***G02F 1/13363*** | (2006.01) |
| ***B32B 17/10*** | (2006.01) |
| ***C08K 5/10*** | (2006.01) |
| ***G02B 5/30*** | (2006.01) |

(52) U.S. Cl.

CPC ..... *B32B 17/10761* (2013.01); *B32B 17/10458* (2013.01); *B32B 17/10605* (2013.01); *C08K 5/10* (2013.01); *G02B 5/3016* (2013.01); *G02F 1/13363* (2013.01); *G02F 2202/28* (2013.01); *Y10T 428/105* (2015.01)

(58) Field of Classification Search

CPC .................... C08F 222/1006; C09K 19/2007; C09K 19/3068; C09K 19/54; C09K 2019/0448

USPC ......................... 428/1.33, 1.5; 349/117–118; 106/169.39

See application file for complete search history.

(56) References Cited

U.S. PATENT DOCUMENTS

| | | | | |
|---|---|---|---|---|
| 3,867,016 | A * | 2/1975 | Sagane | 324/76.11 |
| 5,235,443 | A | 8/1993 | Barnik et al. | |
| 5,409,979 | A * | 4/1995 | Nakai | 524/306 |
| 6,259,559 | B1 | 7/2001 | Kobayashi et al. | |
| 6,630,973 | B1 * | 10/2003 | Matsuoka et al. | 349/117 |
| 2003/0139520 | A1 | 7/2003 | Toyama et al. | |
| 2004/0096594 | A1 | 5/2004 | Takeuchi et al. | |
| 2004/0100600 | A1 * | 5/2004 | Takeuchi et al. | 349/117 |
| 2005/0243252 | A1 * | 11/2005 | Matsuoka | 349/117 |
| 2005/0266175 | A1 | 12/2005 | Hsu et al. | |
| 2006/0008658 | A1 * | 1/2006 | Fukatani et al. | 428/437 |

(Continued)

FOREIGN PATENT DOCUMENTS

| | | | |
|---|---|---|---|
| CN | 1516816 | A | 7/2004 |
| CN | 101218523 | | 7/2008 |

(Continued)

OTHER PUBLICATIONS

International Search Report issued Feb. 2, 2010 in International (PCT) Application No. PCT/JP2009/071270.

(Continued)

*Primary Examiner* — Sophie Hon

(74) *Attorney, Agent, or Firm* — Wenderoth, Lind & Ponack, L.L.P.

(57) ABSTRACT

A laminate for a laminated glass, comprising an interlayer film for a laminated glass laminated with a retardation element interposed between an adhesive layer A and an adhesive layer B, wherein the retardation element contains a liquid-crystal compound and at least one compound selected from the group consisting of a compound represented by the following formula (1), a compound represented by the following formula (2), and a compound represented by the following formula (3). In formula (1), n represents an integer from 3 to 10 and $R^2$ represents a $-CH_2-CH_2-$ group, a $-CH_2-CH(CH_3)-$ group, or a $-CH_2-CH_2-CH_2-$ group. In formula (2), $R^3$ represents a $-(CH_2)_p-$ group or a phenylene group and p represents an integer from 4 to 8. In formula (3), $R^4$ represents a substituted phenylene group. $R^{1-1}$, $R^{1-2}$, and $R^{1-3}$ in formulas (1) to (3) are the same or different, each representing an alkyl group that has a branched structure and that contains at least 5 carbon atoms.

(1)

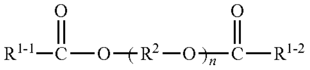

(2)

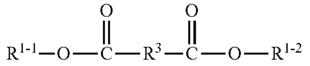

(3)

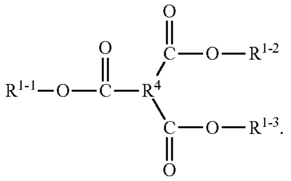

9 Claims, 1 Drawing Sheet

(56) References Cited

U.S. PATENT DOCUMENTS

| | | | | |
|---|---|---|---|---|
| 2006/0062938 | A1 | 3/2006 | Takeko et al. | |
| 2006/0141171 | A1* | 6/2006 | Tazaki et al. | 428/1.21 |
| 2006/0246296 | A1 | 11/2006 | Xia et al. | |
| 2007/0009676 | A1 | 1/2007 | Tamagawa et al. | |
| 2007/0154718 | A1* | 7/2007 | Silverman et al. | 428/411.1 |
| 2007/0252293 | A1* | 11/2007 | Sato et al. | 264/1.31 |
| 2008/0129073 | A1 | 6/2008 | Nishikawa | |
| 2009/0027599 | A1* | 1/2009 | Ohgaru et al. | 349/96 |
| 2009/0108234 | A1* | 4/2009 | Tano et al. | 252/299.66 |

FOREIGN PATENT DOCUMENTS

| | | | |
|---|---|---|---|
| EP | 1 281 690 | | 2/2003 |
| JP | 3-45906 | | 2/1991 |
| JP | 3-291622 | | 12/1991 |
| JP | 5-85784 | | 4/1993 |
| JP | 6-43453 | | 2/1994 |
| JP | 8-50206 | | 2/1996 |
| JP | 8-259280 | | 10/1996 |
| JP | 10-96874 | | 4/1998 |
| JP | 2003-96207 | | 4/2003 |
| JP | 2003-121853 | | 4/2003 |
| JP | 2003-315556 | | 11/2003 |
| JP | 2004-29824 | | 1/2004 |
| JP | 2004-125830 | | 4/2004 |
| JP | 2005-187271 | | 7/2005 |
| JP | 2006-98466 | | 4/2006 |
| JP | 2008-9346 | | 1/2008 |
| JP | 2008-105942 | | 5/2008 |
| JP | 2008-107659 | | 5/2008 |
| JP | 2009-98618 | | 5/2009 |
| WO | WO 2005081642 | A2 * | 9/2005 |

OTHER PUBLICATIONS

International Search Report issued Jan. 19, 2010 in International (PCT) Application No. PCT/JP2009/070571.

Search Report issued May 15, 2014, in corresponding European Application No. 09831913.0.

Extended European Search Report issued Jun. 17, 2014 in European Application No. 09834849.3.

* cited by examiner

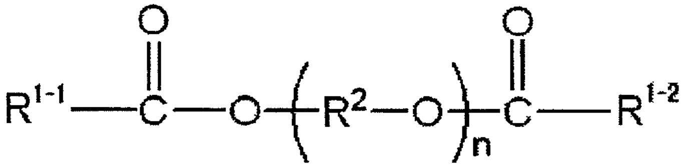
(1)
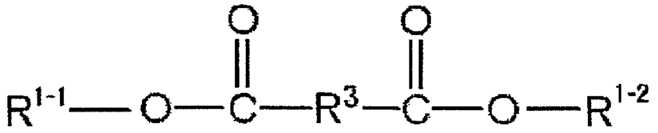
(2)
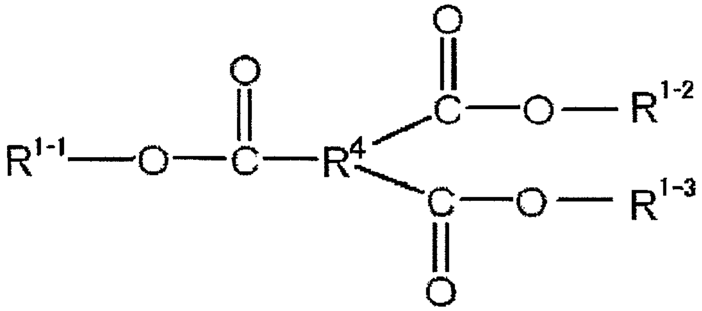
(3)

LAMINATE FOR LAMINATED GLASS

This application is a U.S. national stage of International Application No. PCT/W2009/071270 filed Dec. 22, 2009.

TECHNICAL FIELD

The present invention relates to a laminate for a laminated glass that exhibits an excellent heat resistance, exhibits little variation in its retardation value in high-temperature atmospheres, and can maintain stable optical properties.

BACKGROUND ART

Retardation elements have the ability to change linearly polarized light oscillating in a certain direction to a different direction and have the ability to convert circularly polarized light or elliptically polarized light to linearly polarized light. These abilities can be used, for example, to improve the viewing angle and contrast of liquid-crystal displays (LCDs). Specific examples known for the utilization of the ability of retardation elements to change polarized light include the use of a retardation element known as a ½-wave plate as a polarization rotator of a polarization beam splitter in a liquid-crystal projector, as disclosed in Patent Document 1, and the use of a retardation element known as a ¼-wave plate to convert the circularly polarized light obtained from a cholesteric liquid crystal to linearly polarized light, as disclosed in Patent Document 2. It is known that this ¼-wave plate can also be used in combination with a polarization plate as a circular polarization plate, in, for example, an anti-reflective filter and so forth.

This retardation element can be exemplified by retardation elements provided by subjecting the heretofore known plastics, e.g., polycarbonate, polyarylate, polyether sulfone, cycloolefin polymer, and so forth, to a monoaxial or biaxial stretch. These are generally called retardation plates or retardation films.

The characteristics of a retardation element can be expressed, for example, by the retardation value, which is determined by the product of the thickness of the element and the birefringence wherein the birefringence is the difference between the refractive index in the slow axis direction (in-plane direction in which the refractive index is the largest) and the fast axis direction (in-plane direction orthogonal to the slow axis direction). Retardation elements have recently been fabricated by causing the alignment of a liquid-crystal compound in a prescribed direction and immobilizing the alignment regime, as disclosed in Patent Documents 3 to 7.

Retardation elements that use liquid-crystal compounds can be made into thin films that cannot be achieved with plastic films. They have also been receiving attention because they characteristically enable the realization of complex alignment regimes that cannot be realized by the stretching carried out with plastic films.

It is known that the viewing angle characteristics, color, and contrast of various types of liquid-crystal displays can be improved by the use of retardation elements that employ such liquid-crystal compounds. For example, Patent Document 3 discloses an improvement in the viewing angle characteristics of a twisted nematic (TN) type liquid-crystal display that uses a retardation element that has a hybrid-aligned discotic liquid-crystal layer. Color compensation in a super twisted nematic (STN) type liquid-crystal display is disclosed in Patent Document 4. Patent Document 5 discloses an improvement to the viewing angle of an electrically controlled birefringence (ECB) type liquid-crystal display that uses a retardation element that has a hybrid-aligned liquid-crystal polyester. Patent Document 6 discloses an improvement to the viewing angle characteristics of optically compensated bend (OCB) type liquid-crystal displays and vertically alignment (VA) type liquid-crystal displays that use twisted-alignment liquid-crystal layers that exhibit a selective reflection wavelength region in the ultraviolet region. The disclosure in Patent Document 7 relates to a compound that is used in liquid-crystal compound-based retardation elements that are employed for compensation in the aforementioned liquid-crystal displays, and also to a method of producing this compound.

It is known that the use of a liquid-crystal polymer-based retardation element in automotive windshield glass can improve upon the problem of the reflected image presenting as a double image due to the two surfaces of the windshield glass, i.e., the inside and outside surfaces. For example, an automotive windshield glass is disclosed in Patent Document 8 that employs an optically functional film comprising a retardation element in film form laminated between two interlayer films.

In the case of these liquid-crystal displays, automotive windshield glass, and so forth, the previously mentioned retardation value is critical for enabling the retardation element to perform the appropriate polarization conversion at the target wavelengths.

However, a problem encountered with this retardation value is that it is changed by various ambient conditions, e.g., a high-temperature atmosphere, a high-temperature, high-humidity atmosphere, and so forth. Taking, for example, the case of the liquid-crystal displays used for automotive instrument panels and liquid-crystal projectors, the change in the retardation value due to exposure to a high-temperature atmosphere causes problems such as a decline in the contrast and viewing angle characteristics of the liquid-crystal display, and there is strong desire for a solution to this problem.

PRIOR ART DOCUMENTS

Patent Documents

Patent Document 1: Japanese Kokai Publication Hei-6-43453 (JP-A H06-43453)

Patent Document 2: Japanese Kokai Publication Hei-3-45906 (JP-A H03-45906)

Patent Document 3: Japanese Kokai Publication Hei-8-50206 (JP-A H08-50206)

Patent Document 4: Japanese Kokai Publication Hei-3-291622 (32-A H03-291622)

Patent Document 5: Japanese Kokai Publication 2004-125830 (32-A 2004-125830)

Patent Document 6: Japanese Kokai Publication 2003-315556 (32-A 2003-315556)

Patent Document 7: Japanese Kokai Publication 2004-29824 (32-A 2004-29824)

Patent Document 8: Japanese Kokai Publication 2006-98466 (JP-A 2006-98466)

SUMMARY OF THE INVENTION

Problems to be Solved by the Invention

An object of the present invention is to provide a laminate for a laminated glass that exhibits an excellent heat resistance, exhibits little variation in its retardation value in high-temperature atmospheres, and can maintain stable optical properties.

Means for Solving the Problems

The present invention is a laminate for a laminated glass, comprising an interlayer film for a laminated glass laminated with a retardation element interposed between an adhesive layer A and an adhesive layer B, wherein the retardation element contains a liquid-crystal compound and at least one compound selected from the group consisting of a compound represented by the following formula (1), a compound represented by the following formula (2), and a compound represented by the following formula (3).

[Formula 1]

(1)

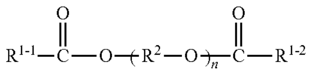

(2)

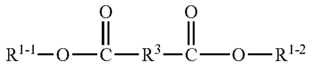

(3)

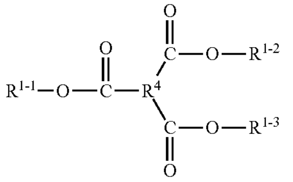

In formula (1), n represents an integer from 3 to 10 and $R^2$ represents a $—CH_2—CH_2—$ group, a $—CH_2—CH(CH_3)—$ group, or a $—CH_2—CH_2—CH_2—$ group.

In formula (2), $R^3$ represents a $—(CH_2)_p—$ group or a phenylene group and p represents an integer from 4 to 8.

In formula (3), $R^4$ presents a substituted phenylene group.

$R^{1-1}$, $R^{1-2}$, and $R^{1-3}$ in formulas (1) to (3) are the same for different, each representing an alkyl group that has a branched structure and that contains at least 5 carbon atoms.

The present invention is described in detail herebelow.

The present inventors discovered that the use of a retardation element comprising a liquid-crystal compound and a special compound in a laminate for a laminated glass comprising an interlayer film for a laminated glass laminated with a retardation element interposed between an adhesive layer A and an adhesive layer B, makes it possible to obtain an excellent heat resistance, to have little variation in the retardation value in high-temperature atmospheres, and to maintain stable optical properties. The present invention was achieved based on this discovery.

The laminate for a laminated glass of the present invention comprises an interlayer film for a laminated glass, an adhesive layer A, a retardation element, and an adhesive layer B laminated in the given sequence. The size of the interlayer film for a laminated glass may be the same as or may differ from the size of the retardation element, but the interlayer film for a laminated glass is preferably larger than the retardation element. In addition, another adhesive layer or a polymer film may also be present between the adhesive layer A and the interlayer film for a laminated glass, or between the retardation element and the adhesive layer B.

The aforementioned retardation element comprises a liquid-crystal compound and at least one compound (hereafter also referred to simply as "the compound") selected from the group consisting of a compound represented by the aforementioned formula (1), a compound represented by the aforementioned formula (2), and a compound represented by the aforementioned formula (3). The retardation element has an excellent heat resistance, exhibits little variation in its retardation value in high-temperature atmospheres, and can maintain stable optical properties.

$R^{1-1}$, $R^{1-2}$, and $R^{1-3}$ in formulas (1) to (3) each represent an alkyl group that has a branched structure and that contains at least 5 carbon atoms. The variation in the retardation value in high-temperature atmospheres becomes particularly minor when $R^{1-1}$, $R^{1-2}$, and $R^{1-3}$ are alkyl groups that have a branched structure. The lower limit on the number of carbon atoms here is preferably 6 and the upper limit is preferably 18. $R^{1-1}$, $R^{1-2}$, and $R^{1-3}$ are preferably a $CH_3—(CH_2)_m—CHR_x—$ group. This Rx represents an alkyl group containing from 1 to 5 carbon atoms.

Among the preceding, $R^{1-1}$, $R^{1-2}$, and $R^{1-3}$ are preferably a $CH_3—(CH_2)_m—CH(C_2H_5)—$ group and more preferably a 2-ethylhexyl group or 2-ethylbutyl group. The m under consideration represents an integer in the range from 1 to 6.

When $R^3$ in formula (2) is a phenylene group, it may have a substituent in any position of ortho, meta and para, and preferably has a substituent in ortho position.

When $R^4$ in formula (3) is a substituted phenylene group, it may have a substituent in any position of ortho, meta and para, and preferably has a substituent in ortho position and para position.

$R^2$ in formula (1) represents a $—CH_2—CH_2—$ group, a $—CH_2—CH(CH_3)—$ group, or a $—CH_2—CH_2—CH_2—$ group. The $—CH_2—CH_2—$ group is preferred thereamong.

The compound represented by formula (1) can be exemplified by triethylene glycol di-2-ethylhexanoate (3GO), tetraethylene glycol di-2-ethylhexanoate (4GO), triethylene glycol di-2-ethylbutyrate (3 GH), tetraethylene glycol di-2-ethylbutyrate, pentaethylene glycol di-2-ethylhexanoate, octaethylene glycol di-2-ethylhexanoate, nonaethylene glycol di-2-ethylhexanoate, and decaethylene glycol di-2-ethylhexanoate.

The compound represented by formula (2) can be exemplified by bis(2-ethylhexyl)adipate, bis(2-ethylbutyl)adipate, bis(2-ethylhexyl)azelate, bis(2-ethylbutyl)azelate, di-2-ethylhexyl sebacate, di-2-ethylbutyl sebacate, di-2-ethylhexyl phthalate, and di-2-ethylbutyl phthalate.

The compound represented by formula (3) can be exemplified by tri-2-ethylhexyl trimellitate and tri-2-ethylbutyl trimellitate.

A single compound represented by formula (1), compound represented by formula (2), or compound represented by formula (3) may be used, or two or more of these may be used in combination. The compound represented by formula (1) is preferred among the preceding because it has an excellent compatibility with the liquid-crystal compound used by the present invention and can thereby provide a stable retardation element. Among compounds represented by formula (1), triethylene glycol di-2-ethylhexanoate (3GO), tetraethylene glycol di-2-ethylhexanoate (4GO), and triethylene glycol di-2-ethylbutyrate (3 GH) are more preferred because they have an excellent compatibility with the liquid-crystal compound used by the present invention and have a particularly good ability to inhibit variations in the retardation value in high-temperature atmospheres. Triethylene glycol di-2-ethylhexanoate (3GO) is even more preferred.

There are no particular limitations on the content of the at least one compound selected from the group consisting of the compound represented by formula (1), the compound represented by formula (2), and the compound represented by formula (3), but a preferred lower limit is 0.1 parts by weight per 100 parts by weight of the liquid-crystal compound and a preferred upper limit is 300 parts by weight per 100 parts by weight of the liquid-crystal compound. It may not be possible to inhibit variation in the retardation value in high-temperature atmospheres when the content of the compound is less than 0.1 parts by weight. There is no further change in the effect of the present invention with regard to preventing variation in the retardation value in high-temperature atmospheres when the content of the compound exceeds 300 parts by weight. A more preferred lower limit for the content of the compound is 0.5 parts by weight and a more preferred upper limit is 50 parts by weight; an even more preferred lower limit is 0.8 parts by weight and an even more preferred upper limit is 30 parts by weight; and a particularly preferred lower limit is 1 part by weight and a particularly preferred upper limit is 15 parts by weight.

The liquid-crystal compound is a compound that exhibits liquid crystallinity when aligned in a particular direction (for example, horizontal alignment, vertical alignment, splay alignment, twisted alignment, tilted alignment, and so forth), but is not otherwise particularly limited. The liquid-crystal compound can be exemplified by main chain type liquid-crystal polymers, e.g., polyester, polyamide, polyesterimide, and so forth; side chain type liquid-crystal polymers, e.g., polyacrylate, polymethacrylate, polymalonate, polyether, and so forth; and polymerizable liquid crystals. A polymerizable liquid crystal refers to a liquid-crystal compound that has a polymerizable group within the molecule. The polymerizable liquid crystal is preferred among the preceding for the liquid-crystal compound because the polymerizable liquid crystal makes possible the immobilization of the alignment regime by polymerization.

The aforementioned polymerizable group is not particularly limited and can be exemplified by reactive groups such as a (meth)acryloyl group, a vinyl group, a chalconyl group, a cinnamoyl group, an epoxy group, and so forth. A polymerizable liquid crystal generally exhibits liquid crystallinity in the state prior to polymerization and is polymerized after alignment in a specific direction, thereby immobilizing the alignment regime. It need not exhibit liquid crystallinity after immobilization, and a compound such as this that has been immobilized into an alignment regime by polymerization is also encompassed by the liquid-crystal compound referenced by the present invention. In addition, a compound provided by the polymerization of one or a plurality of the polymerizable liquid crystal, and a compound provided by the copolymerization of the polymerizable liquid crystal with another polymerizable compound, are both encompassed by the liquid-crystal compound referenced by the present invention as long as liquid crystallinity is displayed at the time of alignment—even if the polymerizable liquid crystal does not display liquid crystallinity prior to polymerization or the post-polymerization compound does not display liquid crystallinity.

The aforementioned polymerizable liquid crystal preferably has a mesogenic group within the molecule in order to display liquid crystallinity.

The mesogenic group can be exemplified by plate-shaped substituents and rod-shaped substituents such as, for example, a biphenyl group, a terphenyl group, a group of phenyl ester of (poly)benzoic acid, a (poly)ether group, a benzylideneaniline group, an acenaphthoquinoxaline group, and so forth, or by disk-shaped substituents such as a triphenylene group, a phthalocyanine group, an azacrown group, and so forth. Thus, the mesogenic group has the ability to induce a liquid-crystal phase behavior. Liquid-crystal compounds that have a rod-shaped or plate-shaped substituent are known as calamitic liquid crystals. Liquid-crystal compounds that have a disk-shaped substituent are known as discotic liquid crystals.

Even if the mesogenic group-containing polymerizable liquid crystal does not itself necessarily display a liquid-crystal phase, it may be a polymerizable liquid crystal that exhibits a liquid-crystal phase through mixing with another compound, another mesogenic group-containing compound or another liquid-crystal compound, or through the polymerization of a mixture of the preceding.

The aforementioned polymerizable liquid crystal is not particularly limited and can be exemplified by the polymerizable liquid crystals described in Japanese Kokai Publications Hei-8-50206 (JP-A H08-50206), 2003-315556 (JP-A 2003-315556), and 2004-29824 (JP-A 2004-29824), by the "PALIOCOLOR Series" produced by BASF, and by the "RMM Series" produced by Merck Ltd. A polymerizable liquid crystal represented by the following formula (4) is more preferred among the preceding because it has an excellent heat resistance by having a plurality of polymerizable groups.

[Formula 2]

(4)

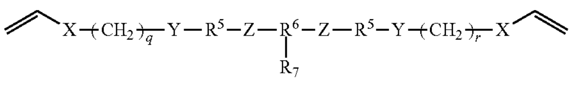

In formula (4), q and r each represent an integer from 1 to 10; X represents —COO— or —O—; Y represents —OC(O)O— or —O—; Z represents —COO or —OCO—; $R^5$ represents a phenylene group; $R^6$ represents a substituted phenylene group, a substituted biphenylene group, or a fluorenyl group; $R^7$ represents —H, $—(CH_2)_w—CH_3$, or $—COO—(CH_2)_w—CH_3$; and w represents an integer from 0 to 11.

In more specific terms, a polymerizable liquid crystal represented by the following formula (4-1) and a polymerizable liquid crystal represented by the following formula (4-2) are more preferred embodiments of the polymerizable liquid crystal represented by formula (4). A single one of these polymerizable liquid crystals may be used or two or more may be used in combination.

[Formula 3]

(4-1)

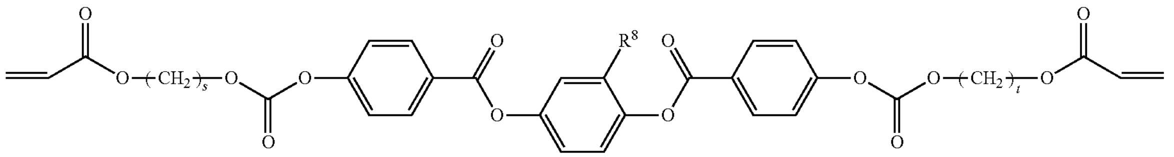

-continued (4-2)

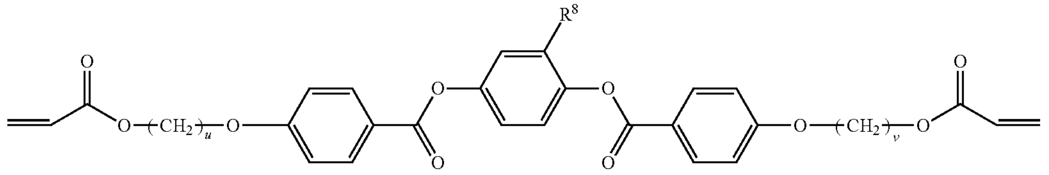

In formula (4-1), s and t each represent an integer from 2 to 10 and $R^8$ represents $-(CH_2)_w-CH_3$.

In formula (4-2), u and v each represent an integer from 2 to 10 and $R^9$ represents $-COO-(CH_2)_w-CH_3$ or $-(CH_2)_w-CH_3$.

w represents an integer from 0 to 11.

When the polymerizable liquid crystal represented by formula (4) is used as the polymerizable liquid crystal under consideration, a polymerizable liquid crystal represented by the following formulas (5) to (7) may also be used in combination therewith in order to adjust the phase transition temperature and the mechanical strength of the retardation element.

product of an isocyanuric ring-containing triisocyanate with pentaerythritol tri(meth)acrylate, the reaction product of pentaerythritol tri(meth)acrylate with isophorone diisocyanate, dipentaerythritol penta(meth)acrylate, dipentaerythritol tetra (meth)acrylate, pentaerythritol tetra(meth)acrylate, pentaerythritol tri(meth)acrylate, trimethylolpropane tri(meth) acrylate, ditrimethylolpropane tetra(meth)acrylate, tris (acryloxyethyl)isocyanurate, tris(methacryloxyethyl) isocyanurate, the reaction product of (meth)acrylic acid with glycerol triglycidyl ether, caprolactone-modified tris(acryloxyethyl)isocyanurate, the reaction product of (meth)acrylic acid with trimethylolpropane triglycidyl ether, triglycerol di(meth)acrylate, the reaction product of (meth)acrylic acid

[Formula 4]

(5)

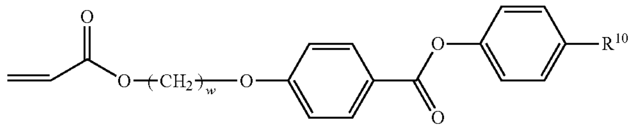

(6)

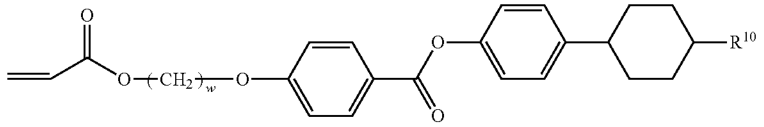

(7)

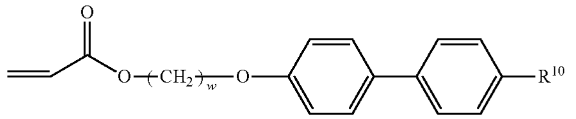

In formulas (5) to (7), w represents an integer from 0 to 11; $R^{10}$ represents $-O-(CH_2)_y-CH_3$, $-(CH_2)_y$, $-CH_3$, or $-CN$; and y represents an integer from 0 to 12.

The liquid-crystal compound may also encompass the previously described polymerizable liquid crystal and a polymerizable compound lacking liquid crystallinity as polymerization components. That is, the liquid-crystal compound may be synthesized by the polymerization of a liquid-crystal composition containing the previously described polymerizable liquid crystal and the aforementioned polymerizable compound. The liquid-crystal composition may contain the compound represented by formula (1), the compound represented by formula (2), or the compound represented by formula (3).

The aforementioned polymerizable compound lacking liquid crystallinity is not particularly limited, and can be exemplified by an ultraviolet-curable compound and so forth.

The ultraviolet-curable compound is not particularly limited, and can be exemplified by dipentaerythritol hexa(meth) acrylate, the reaction product of 1,6-hexamethylene diisocyanate with dipentaerythritol penta(meth)acrylate, the reaction with propylene glycol diglycidyl ether, polypropylene glycol di(meth)acrylate, tripropylene glycol di(meth)acrylate, polyethylene glycol di(meth)acrylate, tetraethylene glycol di(meth)acrylate, triethylene glycol di(meth)acrylate, pentaerythritol di(meth)acrylate, the reaction product of (meth) acrylic acid with 1,6-hexanediol diglycidyl ether, 1,6-hexanediol di(meth)acrylate, glycerol di(meth)acrylate, the reaction product of (meth)acrylic acid with ethylene glycol diglycidyl ether, the reaction product of (meth)acrylic acid with diethylene glycol diglycidyl ether, bis(acryloxyethyl) hydroxyethyl isocyanurate, bis(methacryloxyethyl)hydroxyethyl isocyanurate, the reaction product of (meth)acrylic acid with bisphenol A diglycidyl ether, tetrahydrofurfuryl(meth) acrylate, caprolactone-modified tetrahydrofurfuryl(meth) acrylate, 2-hydroxyethyl(meth)acrylate, 2-hydroxypropyl (meth)acrylate, polypropylene glycol(meth)acrylate, polyethylene glycol(meth)acrylate, phenoxyhydroxypropyl (meth)acrylate, acryloylmorpholine, methoxypolyethylene glycol(meth)acrylate, methoxytetraethylene glycol(meth) acrylate, methoxytriethylene glycol(meth)acrylate, methoxyethylene glycol(meth)acrylate, methoxyethyl(meth)acrylate, glycidyl(meth)acrylate, glycerol(meth)acrylate, ethylcarbitol(meth)acrylate, 2-ethoxyethyl(meth)acrylate, N,N-dimethylaminoethyl(meth)acrylate, 2-cyanoethyl (meth)acrylate, the reaction product of (meth)acrylic acid with butyl glycidyl ether, butoxytriethylene glycol(meth) acrylate, butanediol mono(meth)acrylate, and so forth. A single one of these polymerizable compounds lacking liquid crystallinity may be used or two or more may be used in combination.

There are no particular limitations on the content in the liquid-crystal composition of the polymerizable compound lacking liquid crystallinity, but the polymerizable compound lacking liquid crystallinity must be incorporated at a level that does not impair the liquid crystallinity of the liquid-crystal composition. A preferred lower limit is 0.1% by weight and a preferred upper limit is 20% by weight, and a more preferred lower limit is 1.0% by weight and a more preferred upper limit is 10% by weight.

When the aforementioned liquid-crystal compound is an ultraviolet-curable polymerizable liquid crystal or when the aforementioned polymerizable compound lacking liquid crystallinity is ultraviolet curable, a photopolymerization initiator is added to the aforementioned liquid-crystal composition for the purpose of bringing about the cure of these components under the effect of ultraviolet radiation.

The photopolymerization initiator is not particularly limited, and can be exemplified by acetophenone compounds such as 2-methyl-1-[4-(methylthio)phenyl]-2-morpholinopropan-1-one ("Irgacure 907" produced by Ciba Specialty Chemicals, Inc.), 2-benzyl-2-dimethylamino-1-(4-morpholinophenyl)-butanone-1 ("Irgacure 369" produced by Ciba Specialty Chemicals, Inc.), 1-hydroxycyclohexyl phenyl ketone ("Irgacure 184" produced by Ciba Specialty Chemicals, Inc.), 4-(2-hydroxyethoxy)phenyl (2-hydroxy-2-propyl)ketone ("Irgacure 2959" produced by Ciba Specialty Chemicals, Inc.), 1-(4-dodecylphenyl)-2-hydroxy-2-methylpropan-1-one ("Darocur 953" produced by Merck Ltd.), 1-(4-isopropylphenyl)-2-hydroxy-2-methylpropan-1-one ("Darocur 1116" produced by Merck Ltd.), 2-hydroxy-2-methyl-1-phenylpropan-1-one ("Irgacure 1173" produced by Ciba Specialty Chemicals, Inc.), diethoxyacetophenone, and so forth; benzoin compounds such as benzoin, benzoin methyl ether, benzoin ethyl ether, benzoin isopropyl ether, benzoin isobutyl ether, 2,2-dimethoxy-2-phenylacetophenone ("Irgacure 651" produced by Ciba Specialty Chemicals, Inc.), and so forth; benzophenone compounds such as benzoylbenzoic acid, methyl benzoylbenzoate, 4-phenylbenzophenone, hydroxybenzophenone, 4-benzoyl-4'-methyldiphenyl sulfide, 3,3'-dimethyl-4-methoxybenzophenone ("Kayacure MBP" produced by Nippon Kayaku Co., Ltd.), and so forth; and thioxanthone compounds such as thioxanthone, 2-chlorothioxanthone ("Kayacure CTX" produced by Nippon Kayaku Co., Ltd.), 2-methylthioxanthone, 2,4-dimethylthioxanthone ("Kayacure RTX" produced by Nippon Kayaku Co., Ltd.), isopropylthioxanthone, 2,4-dichlorothioxanthone ("Kayacure CTX" produced by Nippon Kayaku Co., Ltd.), 2,4-diethylthioxanthone ("Kayacure DETX" produced by Nippon Kayaku Co., Ltd.), 2,4-diisopropylthioxanthone ("Kayacure DITX" produced by Nippon Kayaku Co., Ltd.), and so forth. A single one of these photopolymerization initiators may be used or two or more may be used in combination.

The content of the photopolymerization initiator in the liquid-crystal composition is not particularly limited, but, considered per 100 parts by weight of the total of the aforementioned ultraviolet-curable polymerizable liquid crystal and the ultraviolet-curable polymerizable compound lacking liquid crystallinity, a preferred lower limit is 0.5 parts by weight and a preferred upper limit is 10 parts by weight and a more preferred lower limit is 2 parts by weight and a more preferred upper limit is 8 parts by weight.

When the benzophenone compound or the thioxanthone compound is used as the photopolymerization initiator, a reaction auxiliary is preferably used in combination therewith in order to accelerate the photopolymerization reaction.

The reaction auxiliary is not particularly limited, and can be exemplified by amine compounds such as triethanolamine, methyldiethanolamine, triisopropanolamine, n-butylamine, N-methyldiethanolamine, diethylaminoethyl methacrylate, Michler's ketone, 4,4'-diethylaminophenone, ethyl 4-dimethylaminobenzoate, (n-butoxy)ethyl 4-dimethylaminobenzoate, isoamyl 4-dimethylaminobenzoate, and so forth.

The content of the reaction auxiliary in the liquid-crystal composition is not particularly limited, but the reaction auxiliary is preferably used in a range that does not influence the liquid crystallinity of the liquid-crystal composition. Considered per 100 parts by weight of the total of the aforementioned ultraviolet-curable polymerizable liquid crystal and the ultraviolet-curable polymerizable compound lacking liquid crystallinity, a preferred lower limit for the reaction auxiliary is 0.5 parts by weight and a preferred upper limit is 10 parts by weight, and a more preferred lower limit is 2 parts by weight and a more preferred upper limit is 8 parts by weight.

In addition, the content of the reaction auxiliary is preferably 0.5 to 2 times the content of the photopolymerization initiator.

The retardation element can be produced, for example, by a step of producing a liquid-crystal composition comprising the liquid-crystal compound and at least one compound selected from the group consisting of the compound represented by the aforementioned formula (1), the compound represented by the aforementioned formula (2), and the compound represented by the aforementioned formula (3); a step of aligning the liquid-crystal composition in a prescribed direction by an alignment treatment; and a step of immobilizing this alignment.

More specifically, for example, the liquid-crystal composition may be dissolved in a solvent to a prescribed concentration and this solution may be applied on a film that has already been subjected to a rubbing treatment. The solvent may then be removed by, for example, heating; and the liquid-crystal compound may be aligned in a prescribed direction by this heating step or by thereafter standing at a temperature at which the liquid-crystal compound exhibits a liquid-crystal phase. In order to immobilize the alignment, the liquid-crystal compound may be cooled as it is, or may be hardened, for example, by polymerization by exposure to ultraviolet radiation in a state in which the alignment regime is maintained. The retardation element may also be produced by subjecting a film obtained by the polymerization of the aforementioned polymerizable liquid crystal to swelling with at least one compound selected from the group consisting of the compound represented by formula (1), the compound represented by formula (2), and the compound represented by formula (3).

The method of performing the aforementioned alignment treatment can be exemplified by a method in which a plastic film, e.g., a polyester film, cellulose film, and so forth, is submitted to a rubbing treatment, and a method in which an alignment film is formed on a glass plate or plastic film and this alignment film is subjected to a rubbing treatment or photoalignment treatment.

The rubbing treatment can be performed using a rubbing roll fabricated by bonding a velvet rubbing fabric, e.g., of nylon, rayon, cotton, and so forth, on a metal roll, e.g., of steel, aluminum, and so forth, using, for example, double-sided tape and so forth. This rubbing roll is then rotated at high speed and the glass plate or plastic film is moved while in contact with the rubbing roll.

The conditions in the rubbing treatment may be adjusted as appropriate using conditions such as, for example, the ease of alignment of the liquid-crystal compound used, the type of rubbing fabric used, the diameter of the rubbing roll, the rate of rubbing roll rotation, the direction of rotation relative to the direction of substrate advance, the length of contact between the substrate and rubbing roll, the force used to press the rubbing roll into the substrate, the substrate transport speed, and, when the substrate is a plastic film, the wrap angle of the rubbing roll contact region with the film and the transport tension for the plastic film.

The method of immobilizing the alignment can be exemplified by the following methods: immobilization by curing an ultraviolet-curable (liquid-crystal) compound by a polymerization reaction carried out by exposure to ultraviolet radiation in the presence of a photopolymerization initiator; immobilization by causing the crosslinking, by the application of heat, of a liquid-crystal composition that contains a (liquid-crystal) compound that bears a functional group such as a hydroxyl group, carboxyl group, amino group, and so forth, in the presence of a crosslinking agent, i.e., a multivalent isocyanate or multivalent epoxy compound capable of engaging in a crosslinking reaction with the aforementioned functional group; and, when using a liquid-crystal compound exhibiting a liquid-crystal phase in a high-temperature range, immobilization of the alignment regime by rapid cooling after alignment in a high-temperature atmosphere.

The method of applying the liquid-crystal composition can be exemplified by a spin coating method, a wire bar coating method, a gravure method, a calender coating method, a spray coating method, a meniscus coating method, a slot die coating method, and so forth, and the particular method is selected as appropriate for obtaining the desired thickness and retardation value.

The exposure dose for the ultraviolet radiation will vary depending on the type and reactivity of the liquid-crystal compound and any other polymerizable compounds, the type and quantity of addition of the photopolymerization initiator, and the film thickness, but may generally be about 100 to 1000 mJ/cm$^2$. In addition, the atmosphere for ultraviolet exposure can be selected as appropriate, in conformity with the ease of carrying out the polymerization, from air and inert gases such as nitrogen.

The hereinabove-described retardation element has an excellent heat resistance, exhibits little variation in its retardation value in high-temperature atmospheres, and can maintain stable optical properties.

With regard to the aforementioned retardation value, letting $n_x$ be the refractive index in the direction of the maximum in-plane refractive index (slow axis) of the retardation element, $n_y$ be the refractive index in the in-plane direction orthogonal to the preceding, $n_z$ be the refractive index in the thickness direction, and d be the thickness, the in-plane retardation value $R_e$ and the retardation value $R_{th}$ in the thickness direction can then be determined using the following formulas (8) and (9), respectively.

$$R_e=(n_x-n_y)\times d \quad (8)$$

$$R_{th}=[\{(n_x+n_y)/2\}-n_z]\times d \quad (9)$$

The values of $n_x$, $n_y$, and $n_z$ can be controlled through the type of the liquid-crystal composition used and the alignment method. Examples of this procedure include adjustment of the surface tension of the substrate for the alignment treatment, adjustment of the rubbing force, adjustment of the type of alignment film, and so forth.

The aforementioned interlayer film for a laminated glass preferably contains a thermoplastic resin.

There are no particular limitations on the thermoplastic resin, and it can be exemplified by a polyvinyl acetal resin, an ethylene-vinyl acetate copolymer resin, an ethylene-acrylic copolymer resin, a polyurethane resin, a sulfur-containing polyurethane resin, a polyvinyl alcohol resin, and so forth. The polyvinyl acetal resin is particularly suitable for use thereamong because when used in combination with a plasticizer it provides an interlayer film for a laminated glass that exhibits an excellent adherence to glass.

The polyvinyl acetal resin is a polyvinyl acetal resin obtained by the acetalization of a polyvinyl alcohol with an aldehyde, but is not otherwise particularly limited; however, a polyvinyl butyral resin is particularly suitable. Two or more polyvinyl acetal resins may be as necessary used in combination.

A preferred lower limit on the degree of acetalization of the polyvinyl acetal resin is 40 mol % and a preferred upper limit is 85 mol %. A more preferred lower limit is 55 mol % and a more preferred upper limit is 80 mol %, and an even more preferred lower limit is 60 mol % and an even more preferred upper limit is 75 mol %.

A preferred lower limit on the degree of butyralization of the aforementioned polyvinyl butyral resin is 40 mol % and a preferred upper limit is 85 mol %. A more preferred lower limit is 55 mol % and a more preferred upper limit is 80 mol %, and an even more preferred lower limit is 60 mol % and an even more preferred upper limit is 75 mol %.

The degree of acetalization and the degree of butyralization can be measured by infrared absorption spectroscopic (IR) methods. These measurements can be carried out, for example, using an FT-IR instrument (FREEEXACT-II, FT-720, manufactured by Horiba Ltd.).

When the polyvinyl butyral resin is used as the polyvinyl acetal resin, a preferred lower limit on its hydroxyl group content is 15 mol % and a preferred upper limit is 35 mol %.

A hydroxyl group content below 15 mol % may result in a decline in the adherence between glass and the interlayer film for a laminated glass and in a decline in the penetration resistance exhibited by the laminated glass. A hydroxyl group content in excess of 35 mol % may result in a hardening of the interlayer film for a laminated glass.

The polyvinyl acetal resin can be produced by the acetalization of a polyvinyl alcohol with an aldehyde.

The polyvinyl alcohol is ordinarily obtained by the saponification of a polyvinyl acetate, and a polyvinyl alcohol with a degree of saponification of 80 to 99.8 mol % is generally used.

A preferred lower limit on the degree of polymerization of the polyvinyl alcohol is 200 and a preferred upper limit is 4000. A degree of polymerization less than 200 may result in a decline in the penetration resistance exhibited by the laminated glass. A degree of polymerization in excess of 4000 may make formation of the interlayer film for a laminated glass quite problematic. A more preferred lower limit for the degree of polymerization is 500 and a more preferred upper limit is 3000, and an even more preferred lower limit is 1000 and an even more preferred upper limit is 2500.

There are no particular limitations on the aldehyde, but generally an aldehyde containing from 1 to 10 carbon atoms is suitably used. The aldehyde containing from 1 to 10 carbon atoms is not particularly limited, and can be exemplified by n-butyraldehyde, isobutyraldehyde, n-valeraldehyde, 2-ethylbutyraldehyde, n-hexyl aldehyde, n-octyl aldehyde, n-nonyl aldehyde, n-decyl aldehyde, formaldehyde, acetaldehyde, benzaldehyde, and so forth n-butyraldehyde, n-hexyl aldehyde, and n-valeraldehyde are preferred among the preceding, while n-butyraldehyde is more preferred.

A single one of these aldehydes may be used or two or more may be used in combination.

The interlayer film for a laminated glass preferably contains a plasticizer in addition to the previously described constitution. The interlayer film for a laminated glass particularly preferably contains a polyvinyl acetal resin and a plasticizer.

The plasticizer is not particularly limited, and can be exemplified by an organic ester plasticizer such as monobasic organic acid ester and polybasic organic acid ester and by a phosphate plasticizer such as an organic phosphate plasticizer and an organic phosphite plasticizer, wherein the plasticizer is preferably a liquid plasticizer.

The monobasic organic acid ester is not particularly limited and can be exemplified by a glycol ester obtained by the reaction of a glycol, e.g., triethylene glycol, tetraethylene glycol, tripropylene glycol, and so forth, with a monobasic organic acid such as butyric acid, isobutyric acid, caproic acid, 2-ethylbutyric acid, heptylic acid, n-octylic acid, 2-ethylhexylic acid, pelargonic acid (n-nonylic acid), decylic acid, and so forth. Among these, triethylene glycol dialkanoate esters are particularly suitable, e.g., triethylene glycol dicaproate, triethylene glycol di-2-ethylbutyrate, triethylene glycol di-n-octylate, triethylene glycol di-2-ethylhexylate, and so forth.

The polybasic organic acid ester is not particularly limited, and can be exemplified by an ester compound of a polybasic organic acid, e.g., adipic acid, sebacic acid, azelaic acid, and so forth, with an alcohol having a straight chain or branched structure containing from 4 to 8 carbon atoms. Among these, dihexyl adipate, dibutyl sebacate, dioctyl azelate, dibutylcarbitol adipate, and so forth, are particularly suitable.

The organic ester plasticizer is not particularly limited, and can be exemplified by triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-2-ethylhexanoate, tetraethylene glycol di-n-heptanoate, dibutyl sebacate, dioctyl azelate, dibutylcarbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, triethylene glycol di-n-heptanoate, tetraethylene glycol di-n-heptanoate, triethylene glycol diheptanoate, tetraethylene glycol diheptanoate, dihexyl adipate, dioctyl adipate, hexylcyclohexyl adipate, a mixture of heptyl adipate and nonyl adipate, diisononyl adipate, heptylnonyl adipate, dibutyl sebacate, oil-modified sebacic acid alkyds, a mixture of a phosphate ester and an adipate ester, and so forth.

The aforementioned organic phosphate plasticizer is not particularly limited and can be exemplified by tributoxyethyl phosphate, isodecyl phenyl phosphate, triisopropyl phosphate, and so forth.

Among the previously cited plasticizers, at least one selection from the group consisting of dihexyl adipate (DHA), triethylene glycol di-2-ethylhexanoate (3GO), tetraethylene glycol di-2-ethylhexanoate (4GO), triethylene glycol di-2-ethylbutyrate (3 GH), tetraethylene glycol di-2-ethylbutyrate (4 GH), tetraethylene glycol di-n-heptanoate (4G7), and triethylene glycol di-n-heptanoate (3G7), can prevent timewise variations in the adhesive strength between glass and the interlayer film for a laminated glass when the metal salt of a carboxylic acid containing 5 or 6 carbon atoms has been incorporated as an adhesive strength modifier.

In addition, the plasticizer is preferably triethylene glycol di-2-ethylhexanoate (3GO), triethylene glycol di-2-ethylbutyrate (3 GH), tetraethylene glycol di-2-ethylhexanoate (4GO), or dihexyl adipate (DHA), and triethylene glycol di-2-ethylhexanoate (3GO) is even more preferred, due to inhibit hydrolysis thereof.

The content of the plasticizer in the interlayer film for a laminated glass is not particularly limited, but, expressed per 100 parts by weight of the previously described thermoplastic resin, a preferred lower limit is 30 parts by weight and a preferred upper limit is 70 parts by weight. When the content of the plasticizer is less than 30 parts by weight, the interlayer film for a laminated glass will take on a high melt viscosity and the degassing performance during laminated glass production may then be reduced. When the plasticizer content exceeds 70 parts by weight, the plasticizer may bleed out from the interlayer film for a laminated glass. A more preferred lower limit for the plasticizer content is 35 parts by weight and a more preferred upper limit is 60 parts by weight.

The interlayer film for a laminated glass preferably also contains an ultraviolet absorber.

Suitable for use as the ultraviolet absorber are a malonate ester compound such as propanedioic acid [(4-methoxyphenyl)methylene]-dimethyl ester ("Hostavin PR-25" produced by Clariant) and an oxanilide compound such as 2-ethyl-2'-ethoxyoxanilide ("Sanduvor VSU" produced by Clariant).

The heretofore known benzotriazole compound, benzophenone compound, triazine compound, and benzoate compound may also be used in combination with the preceding as the aforementioned ultraviolet absorber.

The benzotriazole compound can be exemplified by 2-(2'-hydroxy-5'-methylphenyl)benzotriazole ("Tinuvin P" produced by Ciba-Geigy Ltd.), 2-(2'-hydroxy-3',5'-di-t-butylphenyl)benzotriazole ("Tinuvin 320" produced by Ciba-Geigy Ltd.), 2-(2'-hydroxy-3'-t-butyl-5'-methylphenyl)-5-chlorobenzotriazole ("Tinuvin 326" produced by Ciba-Geigy Ltd.), 2-(2'-hydroxy-3',5'-diamylphenyl)benzotriazole ("Tinuvin 328" produced by Ciba-Geigy Ltd.), and so forth. Hindered amine compounds such as LA-57 (produced by Adeka Argus Chemical Co., Ltd.) may also be used.

The benzophenone compound can be exemplified by octabenzone ("Chimassorb 81" produced by Ciba-Geigy Ltd.).

The triazine compound can be exemplified by 2-(4,6-diphenyl-1,3,5-triazin-2-yl)-5-[(hexyl)oxy]phenol ("Tinuvin 1577FF" produced by Ciba-Geigy Ltd.).

The benzoate compound can be exemplified by 2,4-di-tert-butylphenyl 3,5-di-tert-butyl-4-hydroxybenzoate ("Tinuvin 120" produced by Ciba-Geigy Ltd.) and so forth.

The content of the ultraviolet absorber in the interlayer film for a laminated glass is not particularly limited, but, expressed per 100 parts by weight of the thermoplastic resin, a preferred lower limit is 0.01 parts by weight and a preferred upper limit is 5.0 parts by weight. Ultraviolet absorbing effect is hardly obtained when the content of the ultraviolet absorber is less than 0.01 parts by weight. The resin may be degraded when the content of the ultraviolet absorber exceeds 5.0 parts by weight. A more preferred lower limit for the content of the ultraviolet absorber is 0.05 parts by weight and a more preferred upper limit is 1.0 part by weight.

As necessary, the interlayer film for a laminated glass may also contain additives such as an oxidation inhibitor, photostabilizer, flame retardant, static inhibitor, adhesive strength modifier, moistureproofing agent, blue pigment, blue dye, green pigment, green dye, fluorescent whitener, infrared absorber, and so forth.

There are no particular limitations on the thickness of the interlayer film for a laminated glass, but a preferred lower limit is 0.1 mm and a preferred upper limit is 3 mm. The penetration resistance of the resulting laminated glass may be reduced when the thickness of the interlayer film for a laminated glass is less than 0.1 mm. The transparency of the resulting interlayer film for a laminated glass may be reduced when the thickness of the interlayer film for a laminated glass exceeds 3 mm. A more preferred lower limit for the thickness of the interlayer film for a laminated glass is 0.25 mm is and a more preferred upper limit is 1.5 mm.

The interlayer film for a laminated glass preferably has a visible light transmittance $T_v$ of at least 60% as measured by the method according to JIS R 3106 using a 760 μm-thick interlayer film for a laminated glass interposed between a pair of 2.5 mm-thick clear glass plates. When the visible light transmittance Tv is less than 60%, the laminated glass obtained using the interlayer film for a laminated glass may have a reduced transparency. The visible light transmittance Tv is preferably at least 70%, more preferably at least 80%, and even more preferably at least 85%.

There are no particular limitations on the instrument used to measure the visible light transmittance Tv, and, for example, a spectrophotometer ("U-4000" manufactured by Hitachi, Ltd.) can be used.

The method of producing the interlayer film for a laminated glass is not particularly limited, and can be exemplified by the addition to the thermoplastic resin of the ultraviolet absorber, plasticizer, and any additives to be incorporated on an optional basis, followed by mixing/kneading and molding into the interlayer film for a laminated glass.

There are no particular limitations on the method of carrying out mixing/kneading, and, for example, an extruder, plastograph, kneader, Banbury mixer, calender roll, and so forth, can be used. The method using an extruder is particularly appropriate from the standpoint of the suitability for continuous production.

There are no particular limitations on the molding method, and, for example, extrusion methods, calendering methods, press methods, and so forth, can be used. The extrusion method is particularly suitable thereamong.

There are no particular limitations on the adhesives (also referred to in the following as adhesive A and adhesive B, respectively) constituting the aforementioned adhesive layer A and adhesive layer B, and, for example, pressure-sensitive adhesives, e.g., an acrylic adhesive, a rubber adhesive, a silicone adhesive, an urethane adhesive, a polyether adhesive, a polyester adhesive, and so forth, are preferred wherein the acrylic adhesive is particularly preferred.

The acrylic adhesive can be exemplified by an acrylic adhesive comprising a polymer obtained by the copolymerization, as the main component of the monomer components, of a plurality of (meth)acrylate esters. The monomer component in the polymer can be exemplified by alkyl(meth)acrylate in which the ester moiety has from 1 to 14 carbon atoms, e.g., ethyl(meth)acrylate, butyl(meth)acrylate, pentyl(meth) acrylate, hexyl(meth)acrylate, heptyl(meth)acrylate, isoamyl (meth)acrylate, 2-ethylhexyl(meth)acrylate, isooctyl(meth) acrylate, isononyl(meth)acrylate, isomyristyl(meth)acrylate, and so forth, and by benzyl(meth)acrylate, naphthyl(meth) acrylate, phenoxyethyl(meth)acrylate, phenoxybutyl(meth) acrylate, 2-hydroxyethyl(meth)acrylate, 4-hydroxyethyl (meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, 12-hydroxylauryl (meth)acrylate, (4-hydroxymethylcyclohexyl)methyl acrylate, 2-methyl-3-hydroxypropyl(meth)acrylate, acrylic acid, methacrylic acid, itaconic acid, maleic acid, glycidyl(meth) acrylate, methylglycidyl(meth)acrylate, 3,4-epoxycyclohexylmethyl(meth)acrylate, methyl(meth)acrylate, methoxyethyl(meth)acrylate, ethoxymethyl(meth)acrylate, and so forth. Copolymerizable monomers such as dimethylaminomethylacrylamide, N,N-dimethylacrylamide, acryloylmorpholine, a vinyl ether monomer, vinyl acetate, (meth)acrylamide, (meth)acrylonitrile, and so forth, can also be used for the monomer component for the aforementioned polymer.

The polymer that constitutes the main component of the acrylic adhesive can be obtained by the copolymerization of the aforementioned monomer. Preferred for use thereamong is a polymer provided by copolymerization using at least one monomer selected from alkyl(meth)acrylate in which the ester moiety has from 1 to 14 carbon atoms, e.g., ethyl(meth) acrylate, butyl(meth)acrylate, pentyl(meth)acrylate, hexyl (meth)acrylate, heptyl(meth)acrylate, isoamyl(meth)acrylate, 2-ethylhexyl(meth)acrylate, isooctyl(meth)acrylate, isononyl(meth)acrylate, isomyristyl(meth)acrylate, and so forth, and at least one monomer selected from methyl(meth) acrylate, 2-hydroxyethyl(meth)acrylate, 4-hydroxyethyl (meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, 12-hydroxylauryl(meth) acrylate, (4-hydroxymethylcyclohexyl)methyl acrylate, 2-methyl-3-hydroxypropyl(meth)acrylate, N,N-dimethylacrylamide, acrylic acid, methacrylic acid, itaconic acid, and maleic acid. The use is particularly preferred of a polymer provided by the copolymerization of butyl(meth)acrylate and acrylic acid; a polymer provided by the copolymerization of butyl(meth)acrylate, methyl(meth)acrylate, and acrylic acid; a polymer provided by the copolymerization of butyl(meth) acrylate, methyl(meth)acrylate, N,N-dimethylacrylamide, and 2-hydroxyethyl(meth)acrylate; a polymer provided by the copolymerization of 2-ethylhexyl(meth)acrylate and 2-hydroxyethyl(meth)acrylate; and a polymer provided by the copolymerization of butyl(meth)acrylate, acrylic acid, and 2-hydroxyethyl(meth)acrylate.

The adhesive may contain a crosslinking agent in order to adjust the durability of the adhesive and adjust the adhesive strength with respect to glass or the retardation element. When monomer containing a hydroxyl group or a carboxyl group is used as a monomer component constituting the adhesive, the crosslinking agent can be exemplified by a crosslinking agent that brings about crosslinking by reacting with the hydroxyl group or carboxyl group. The crosslinking agent can be exemplified by an isocyanate compound, an epoxy compound, a metal chelate compound, a melamine compound, an aziridine compound, metal salt, and so forth. The isocyanate compound can be exemplified by toluene diisocyanate, hydrogenated toluene diisocyanate, toluene diisocyanate adduct of trimethylolpropane, xylylene diisocyanate of trimethylolpropane, triphenylmethane triisocyanate, methylenebis(4-phenylmethane) triisocyanate, isophorone diisocyanate, hexamethylene diisocyanate, ketoxime-blocked products of the preceding, phenol-blocked products of the preceding, and so forth. The isocyanate compound can also be exemplified by polyisocyanate compounds that form an isocyanurate ring, biuret structure, allophanate structure, and so forth.

The epoxy compound can be exemplified by bisphenol A, epichlorohydrin epoxy resins, ethylene glycol diglycidyl ether, polyethylene glycol diglycidyl ether, glycerol diglycidyl ether, glycerol triglycidyl ether, 1,6-hexanediol diglycidyl ether, trimethylolpropane triglycidyl ether, and so forth.

The aforementioned metal chelate compound can be exemplified by acetylacetone or acetoacetate ester coordination compounds of multivalent metals such as aluminum, iron, copper, zinc, tin, titanium, nickel, magnesium, and so forth.

A single crosslinking agent may be used or a mixture of a plurality of crosslinking agents may be used, but in order to reduce discoloration in high-temperature environments the use is preferred of isophorone diisocyanate, hexamethylene diisocyanate, the ketoxime-blocked or phenol-blocked products of the preceding, and the epoxy compound. The quantity of crosslinking agent addition will vary with the reactivity and properties desired of the adhesive, but, expressed per 100 parts by weight of the previously discussed monomer component, it is preferably in the range of 0.001 to 10 parts by weight and more preferably is in the range of 0.01 to 5 parts by weight.

With regard to the adhesive layers, the same adhesive may be used for both adhesive layer A and adhesive layer B or different adhesives may be used for these layers. Different adhesives denote a difference with regard to the molecular weight, composition of the polymer constituting the adhesive layer, glass-transition temperature, and so forth. For example, since the interlayer film for a laminated glass is glued by the adhesive layer A and the vehicle interior glass is glued by the adhesive layer B when the laminated glass is fabricated using the laminate for a laminated glass according to the present invention, the use of different polymer compositions is preferred because this makes possible the adjustment of the adhesive strength for each of the respective materials. In addition, the heat resistance of the retardation element is further improved by the use, in at least one of the adhesives in the adhesive layers, of an adhesive that contains a polymer provided by the copolymerization of a plurality of monomer components that include acrylic acid. The adhesive layer may be formed of only one layer or different adhesive layers may be stacked together.

The aforementioned adhesive layer preferably also contains a silane coupling agent in order to raise its adhesive strength with the materials to which it is glued, e.g., glass plate and so forth, and in order to inhibit changes in appearance after the heat resistance evaluation. The silane coupling agent can be exemplified by vinyltrichlorosilane ("KA-1003" produced by Shin-Etsu Chemical Co., Ltd.), vinyltrimethoxysilane ("KBM-1003" produced by Shin-Etsu Chemical Co., Ltd.), vinyltriethoxysilane ("KBE-1003" produced by Shin-Etsu Chemical Co., Ltd.), vinyltris(β-methoxyethoxy)silane ("KBC-1003" produced by Shin-Etsu Chemical Co., Ltd.), β-(3,4-epoxycyclohexyl)ethyltrimethoxysilane ("KBM-303" produced by Shin-Etsu Chemical Co., Ltd.), γ-glycidoxypropyltrimethoxysilane ("KBM-403" produced by Shin-Etsu Chemical Co., Ltd.), γ-glycidoxypropylmethyldiethoxysilane ("KBE-402" produced by Shin-Etsu Chemical Co., Ltd.), γ-glycidoxypropyltriethoxysilane ("KBE-403" produced by Shin-Etsu Chemical Co., Ltd.), γ-methacryloxypropylmethyldimethoxysilane ("KBM-502" produced by Shin-Etsu Chemical Co., Ltd.), γ-methacryloxypropyltrimethoxysilane ("KBM-503" produced by Shin-Etsu Chemical Co., Ltd.), γ-methacryloxypropylmethyldiethoxysilane ("KBE-502" produced by Shin-Etsu Chemical Co., Ltd.), γ-methacryloxypropyltriethoxysilane ("KBE-503" produced by Shin-Etsu Chemical Co., Ltd.), γ-methacryloxypropyltrimethoxysilane ("SZ-6030" produced by Dow Corning Toray Silicone Co., Ltd.), N-β-(N-vinylbenzylaminoethyl)-γ-aminopropyltrimethoxysilane hydrochloride ("SZ-6032" produced by Dow Corning Toray Silicone Co., Ltd.), γ-aminopropyltrimethoxysilane ("SZ-6083" produced by Dow Corning Toray Silicone Co., Ltd.), γ-diallylaminopropyltrimethoxysilane ("AX43-065" produced by Dow Corning Toray Silicone Co., Ltd.), N-β-(aminoethyl)-γ-aminopropylmethyldimethoxysilane ("KBM-602" produced by Shin-Etsu Chemical Co., Ltd.), N-β-(aminoethyl)-γ-aminopropyltrimethoxysilane ("KBM-603" produced by Shin-Etsu Chemical Co., Ltd.), N-β-(aminoethyl)-γ-aminopropyltriethoxysilane ("KBE-603" produced by Shin-Etsu Chemical Co., Ltd.), γ-aminopropyltrimethoxysilane ("KBM-903" produced by Shin-Etsu Chemical Co., Ltd.), γ-aminopropyltriethoxysilane ("KBM-903" produced by Shin-Etsu Chemical Co., Ltd.), N-phenyl-γ-aminopropyltrimethoxysilane ("KBM-573" produced by Shin-Etsu Chemical Co., Ltd.), γ-(2-aminoethyl)aminopropyltrimethoxysilane ("SH6020" produced by Dow Corning Toray Silicone Co., Ltd.), γ-(2-aminoethyl)aminopropylmethyldimethoxysilane ("SH6023" produced by Dow Corning Toray Silicone Co., Ltd.), γ-chloropropyltrimethoxysilane ("KBM-703" produced by Shin-Etsu Chemical Co., Ltd.), γ-mercaptopropyltrimethoxysilane ("KBM-803" produced by Shin-Etsu Chemical Co., Ltd.), and so forth.

The adhesive layer may also incorporate an ultraviolet absorber in order to improve the lightfastness of the adhesive layer and retardation element. The ultraviolet absorber can be exemplified by a malonate ester compound, an oxanilide compound, a benzotriazole compound, a benzophenone compound, a triazine compound, a benzoate compound, a hindered amine compound, and so forth.

The method of producing the adhesive layer is not particularly limited and can be exemplified by a method in which the previously described polymer and crosslinking agent and the optionally added silane coupling agent and ultraviolet absorber are mixed with and dissolved in a solvent to prepare a solution; this solution is applied on a release film at a desired thickness; and then, by drying with the application of heat, the solvent is removed and an adhesive layer is formed in which the polymer is crosslinked.

There are no particular limitations on the method of producing the laminate for a laminated glass of the present invention. As an example, the laminate for a laminated glass can be produced by pasting the retardation element onto an adhesive layer formed on a release film and fabricating a retardation element laminate in which a release film A, the adhesive layer A, the retardation element, the adhesive layer B, and a release film B are laminated in the given sequence. The release film A can then be peeled off, and the laminate for a laminated glass can be fabricated by pasting the adhesive layer A onto an interlayer film for a laminated glass.

The release film B is then peeled off and the resulting laminate for a laminated glass can be laminated with the substrate, e.g., glass plate, a polarization plate, and so forth.

Effect of the Invention

The present invention can provide a laminate for a laminated glass, that exhibits an excellent heat resistance, that exhibits little variation in its retardation value in high-temperature atmospheres, and that can maintain stable optical properties.

MODE FOR CARRYING OUT THE INVENTION

Embodiments of the present invention are more particularly described by the examples that follow, but the present invention is not limited to only these examples.

Example 1

(1) Fabrication of the Retardation Element

In 243 parts by weight cyclopentanone, 100 parts by weight of an ultraviolet-curable polymerizable liquid crystal ("PALIOCOLOR LC242" produced by BASF, a polymerizable liquid crystal represented by formula (4-1) wherein s is 4 and t is 4), 4 parts by weight 2,4,6-trimethylbenzoyldiphenylphosphine oxide-("Lucirin TPO" produced by BASF), and 0.1 parts by weight of a leveling agent ("BYK361" produced by BYK) were dissolved to prepare a solution that had a solids fraction of 30% by weight. 10 parts by weight triethylene glycol di-2-ethylhexanoate (3GO) was then added and stirring was carried out to uniformity to prepare a solution of a liquid-crystal composition. A polyester film ("A4100" produced by Toyobo Co., Ltd.) was subsequently subjected to a rubbing treatment using a rubbing machine (manufactured by EHC Co., Ltd., rubbing roll diameter=45 mm, rubbing roll rotation rate=1500 rpm, transport speed=1 m/min). The liquid-crystal composition solution was applied by spin coating on the rubbed side; drying was carried out for 1 minute at 80° C.; and curing was then performed by exposure to a high-pressure mercury lamp (630 mJ/cm$^2$) under a nitrogen-substituted atmosphere to obtain a film bearing a retardation element. The obtained retardation element had a thickness of 4 μm. After removal of the polyester film, the retardation value of the retardation element was measured using an automatic birefringence analyzer ("KOBRA-21ADH" manufactured by Oji Scientific Instruments); the result was a retardation value of 270 nm at 540 nm.

(2) Fabrication of the Interlayer Film for a Laminated Glass

A solution of 0.2 parts by weight of a benzotriazole compound ultraviolet absorber (Tinuvin 326) and 0.2 parts by weight 2,6-di-tert-butyl-p-cresol as an oxidation inhibitor dissolved in 40 parts by weight triethylene glycol di-2-ethylhexanoate (3GO) plasticizer was added to 100 parts by weight polyvinyl butyral resin (PVB) and this was melt mixed/kneaded to uniformity with a mixing roll, after which press molding at 150° C. for 30 minutes using a press molder produced a 0.76 mm-thick interlayer film (length 300 mm×width 300 mm) for a laminated glass.

(3) Production of the Laminate for a Laminated Glass

One of the release films was peeled from an acrylic adhesive layer A sandwiched between two release films and the adhesive layer A was pasted onto the retardation element side of the previously prepared film bearing the retardation element (length 120 mm×width 120 mm). The polyester film was subsequently peeled from the retardation element; one of the release films was peeled from an acrylic adhesive layer B sandwiched between two release films; and the adhesive layer B was pasted on the retardation element to produce a retardation element laminate in which a release film/adhesive layer A/retardation element/adhesive layer B/release film were laminated in the indicated sequence.

The adhesive layers A and B are adhesive layers obtained by crosslinking, using an isocyanate crosslinking agent, a polymer obtained by the copolymerization of butyl acrylate and acrylic acid.

The release film was peeled from the adhesive layer A side of the obtained retardation element laminate and a laminate for a laminated glass was fabricated by pasting the adhesive layer A onto the previously prepared interlayer film for a laminated glass, with the process being carried out so the center of the retardation element coincided with the center of the interlayer film for a laminated glass.

(4) Production of the Laminated Glass

The release film was peeled from the adhesive layer B side of the obtained laminate for a laminated glass and the laminate for a laminated glass was then inserted between two transparent glass plates (length 300 mm×width 300 mm×thickness 2.5 mm); this was subsequently introduced into a rubber bag and preliminary bonding was performed at a temperature of 100° C. under reduced pressure. Using an autoclave, the pre-bonded laminated glass was subjected to primary bonding by the application of heat and pressure for 20 minutes at a temperature of 140° C. and a pressure of 1.3 MPa to produce a laminated glass.

The obtained laminated glass was measured with an automatic birefringence analyzer ("KOBRA-21ADH" manufactured by Oji Scientific Instruments); the result was a retardation value (initial retardation value) of 270 nm at 540 nm.

Example 2

A retardation element was fabricated as in Example 1, except for changing the quantity of addition of triethylene glycol di-2-ethylhexanoate (3GO) to 1 part by weight. The obtained retardation element had a thickness of 2 μm and gave a retardation value of 270 nm at 540 nm. A laminate for a laminated glass and a laminated glass were produced as in Example 1, except for using the retardation element obtained here.

Example 3

A retardation element was fabricated as in Example 1, except for changing the quantity of addition of triethylene glycol di-2-ethylhexanoate (3GO) to 5 parts by weight. The obtained retardation element had a thickness of 3 μm and gave a retardation value of 270 nm at 540 nm. A laminate for a laminated glass and a laminated glass were produced as in Example 1, except for using the retardation element obtained here.

Example 4

A retardation element was fabricated as in Example 1, except for changing the quantity of addition of triethylene glycol di-2-ethylhexanoate (3GO) to 12 parts by weight. The obtained retardation element had a thickness of 4 μm and gave a retardation value of 270 nm at 540 nm. A laminate for a laminated glass and a laminated glass were produced as in Example 1, except for using the retardation element obtained here.

Example 5

A laminate for a laminated glass and a laminated glass were produced as in Example 2, except for using as the acrylic adhesive layer an adhesive layer provided by the crosslinking, using an epoxy crosslinking agent, of a polymer provided by the copolymerization of butyl acrylate, methyl acrylate, and acrylic acid.

Example 6

In 100 parts by weight cyclopentanone, 98 parts by weight of an ultraviolet-curable polymerizable liquid crystal represented by formula (4-2) wherein u was 6, v was 6, and $R^9$ was —C(=O)$OC_5H_{11}$ and 2 parts by weight 2-benzyl-2-dimethylamino-1-(4-morpholinophenyl)-butanone-1 ("Irgacure 369" produced by Ciba Specialty Chemicals, Inc.) were dissolved to prepare a solution that had a solids fraction of 50% by weight. 10 parts by weight triethylene glycol di-2-ethylhexanoate (3GO) was then added and stirring was carried out to uniformity to prepare a solution of a liquid-crystal composition. A film bearing a retardation element was obtained using this solution and the same procedure as in Example 1. The obtained retardation element had a thickness of 5 μm. After removal of the polyester film, the retardation value of the retardation element was measured using an automatic birefringence analyzer ("KOBRA-21ADH" manufactured by Oji Scientific Instruments); the result was a retardation value of 340 nm at 540 nm. A laminate for a laminated glass and a laminated glass were produced as in Example 1, except for using the retardation element obtained here.

Example 7

A retardation element was obtained as in Example 6, except for using 10 parts by weight tetraethylene glycol di-2-ethylhexanoate (4GO) in place of triethylene glycol di-2-ethylhexanoate (3GO). The obtained retardation element had a thickness of 4 μm. After removal of the polyester film, the retardation value of the retardation element was measured using an automatic birefringence analyzer ("KOBRA-21ADH" manufactured by Oji Scientific Instruments); the result was a retardation value of 279 nm at 540 nm. A laminate for a laminated glass and a laminated glass were produced as in Example 1, except for using the retardation element obtained here.

Example 8

A retardation element was obtained as in Example 6, except for using 10 parts by weight triethylene glycol di-2-ethylbutyrate (3 GH) in place of triethylene glycol di-2-ethylhexanoate (3GO). The obtained retardation element had a thickness of 4 μm. After removal of the polyester film, the retardation value of the retardation element was measured using an automatic birefringence analyzer ("KOBRA-21ADH" manufactured by Oji Scientific Instruments); the result was a retardation value of 278 nm at 540 nm. A laminate for a laminated glass and a laminated glass were produced as in Example 1, except for using the retardation element obtained here.

Example 9

A retardation element was obtained as in Example 6, except for using 10 parts by weight di-2-ethylhexyl phthalate in place of triethylene glycol di-2-ethylhexanoate (3GO). The obtained retardation element had a thickness of 5 μm. After removal of the polyester film, the retardation value of the retardation element was measured using an automatic birefringence analyzer ("KOBRA-21ADH" manufactured by Oji Scientific Instruments); the result was a retardation value of 307 nm at 540 nm. A laminate for a laminated glass and a laminated glass were produced as in Example 1, except for using the retardation element obtained here.

Comparative Example 1

A retardation element was fabricated as in Example 1, but without adding triethylene glycol di-2-ethylhexanoate (3GO). The obtained retardation element had a thickness of 3 μm and a retardation value of 270 nm at 540 nm. A laminate for a laminated glass and a laminated glass were produced as in Example 1, except for using the retardation element obtained here.

Comparative Example 2

A laminated glass was fabricated by pasting a retardation film, which had been fabricated by subjecting a polycarbonate film to a monoaxial stretch, on a glass plate using the acrylic adhesive layer used in Example 1.

Comparative Example 3

A retardation element was obtained as in Example 6, but without adding triethylene glycol di-2-ethylhexanoate (3GO). The obtained retardation element had a thickness of 3 μm and a retardation value of 275 nm at 540 nm. A laminate for a laminated glass and a laminated glass were produced as in Example 1, except for using the retardation element obtained here.

Comparative Example 4

A retardation element was obtained as in Example 6, except for using 10 parts by weight dibutyl malate in place of triethylene glycol di-2-ethylhexanoate (3GO). The obtained retardation element had a thickness of 3 μm. After removal of the polyester film, the retardation value of the retardation element was measured using an automatic birefringence analyzer ("KOBRA-21ADH" manufactured by Oji Scientific Instruments); the result was a retardation value of 226 nm at 540 nm. A laminate for a laminated glass and a laminated glass were produced as in Example 1, except for using the retardation element obtained here.

Comparative Example 5

A retardation element was obtained as in Example 6, except for using 10 parts by weight di-n-tridecyl phthalate in place of triethylene glycol di-2-ethylhexanoate (3GO). The obtained retardation element had a thickness of 4 μm. After removal of the polyester film, the retardation value of the retardation element was measured using an automatic birefringence analyzer ("KOBRA-21ADH" manufactured by Oji Scientific Instruments); the result was a retardation value of 244 nm at 540 nm. A laminate for a laminated glass and a laminated glass were produced as in Example 1, except for using the retardation element obtained here.

Comparative Example 6

A retardation element was obtained as in Example 6, except for using 10 parts by weight triethyl citrate in place of triethylene glycol di-2-ethylhexanoate (3GO). The obtained retardation element had a thickness of 4 μm. After removal of the polyester film, the retardation value of the retardation element was measured using an automatic birefringence analyzer ("KOBRA-21ADH" manufactured by Oji Scientific Instruments); the result was a retardation value of 245 nm at 540 nm. A laminate for a laminated glass and a laminated glass were produced as in Example 1, except for using the retardation element obtained here.

Comparative Example 7

A retardation element was obtained as in Example 6, except for using 10 parts by weight triethylene glycol di-n- heptanoate (3G7) in place of triethylene glycol di-2-ethylhexanoate (3GO). The obtained retardation element had a thickness of 3 μm. After removal of the polyester film, the retardation value of the retardation element was measured using an automatic birefringence analyzer ("KOBRA-21ADH" manufactured by Oji Scientific Instruments); the result was a retardation value of 226 nm at 540 nm. A laminate for a laminated glass and a laminated glass were produced as in Example 1, except for using the retardation element obtained here.

<Evaluations>

(Heat Resistance Evaluation 1)

The following evaluations were performed on the laminated glasses obtained in Examples 1 to 9 and Comparative Examples 1 to 7. The results are given in Table 1.

The initial retardation value at 540 nm was obtained by measurement on the laminated glass using an automatic birefringence analyzer ("KOBRA-21ADH" manufactured by Oji Scientific Instruments), and the results are shown in Table 1. The laminated glass was then held for 30 minutes in a high-temperature atmosphere at 140° C. and the percentage variation in the retardation value pre-/post-holding was determined. The percentage variation in Table 1 is the value determined using the following formula.

variation (%)=[{(retardation value after 30 minutes at 140° C.)−(initial retardation value)}/(initial retardation value)]×100

(Heat Resistance Evaluation 2)

The following evaluation was performed on the laminated glass from Examples 1, 2, 5, 6, and 9 among the examples and on the laminated glass from Comparative Examples 1 and 3 to 7 among the comparative examples. The results are given in Table 2.

The initial retardation value at 540 nm was obtained by measurement on the laminated glass using an automatic birefringence analyzer ("KOBRA-21ADH" manufactured by Oji Scientific Instruments), and the results are shown in Table 2. The laminated glass was then held for 2 weeks in a high-temperature atmosphere at 100° C. and the percentage variation in the retardation value pre-/post-holding was determined. The percentage variation in Table 2 is the value determined using the following formula.

variation (%)=[{(retardation value after 2 weeks at 100° C.)−(initial retardation value)}/(initial retardation value)]×100

TABLE 1

| | Initial retardation value (nm) | Retardation value after 30 minutes at 140° C. (nm) | Variation in Heat Resistance Evaluation 1 (%) |
|---|---|---|---|
| Example 1 | 270 | 269 | −0.4 |
| Example 2 | 270 | 257 | −4.8 |
| Example 3 | 270 | 260 | −3.7 |
| Example 4 | 270 | 272 | 0.7 |
| Example 5 | 270 | 259 | −4.1 |
| Example 6 | 340 | 339 | −0.3 |
| Example 7 | 279 | 272 | −2.5 |
| Example 8 | 278 | 274 | −1.4 |
| Example 9 | 307 | 301 | −2.0 |
| Comparative Example 1 | 270 | 225 | −16.7 |
| Comparative Example 2 | 263 | 199 | −24.3 |
| Comparative Example 3 | 275 | 260 | −5.5 |
| Comparative Example 4 | 226 | 215 | −4.9 |
| Comparative Example 5 | 244 | 225 | −7.8 |
| Comparative Example 6 | 245 | 229 | −6.5 |
| Comparative Example 7 | 226 | 214 | −5.3 |

TABLE 2

| | Initial retardation value (nm) | Retardation value after 2 weeks at 100° C. (nm) | Variation in Heat Resistance Evaluation 2 (%) |
|---|---|---|---|
| Example 1 | 270 | 264 | −2.2 |
| Example 2 | 270 | 259 | −4.1 |
| Example 5 | 270 | 269 | −0.4 |
| Example 6 | 340 | 335 | −1.5 |
| Example 9 | 307 | 300 | −2.3 |
| Comparative Example 1 | 270 | 205 | −24.1 |
| Comparative Example 3 | 275 | 240 | −12.7 |
| Comparative Example 4 | 226 | 204 | −9.7 |
| Comparative Example 5 | 244 | 213 | −12.7 |
| Comparative Example 6 | 245 | 221 | −9.8 |
| Comparative Example 7 | 226 | 204 | −9.7 |

The results in Table 1 demonstrated that the inhibition of the variation in the retardation value in a high-temperature atmosphere was much greater for the laminated glass fabricated in Examples 1 to 5 than for the laminated glass fabricated in Comparative Example 1. Moreover, notwithstanding the fact that the compound used in Comparative Example 7 was structurally similar to the compounds used in Examples 6 and 8, it was shown that the laminated glass of Examples 6 and 8 exhibited little variation in the retardation value in a high-temperature atmosphere, while, on the other hand, the laminated glass of Comparative Example 7 exhibited a variation about the same as that of the laminated glass of Comparative Example 3, which did not incorporate the compound, and thus substantially lacked an ability to inhibit the variation in the retardation value. Furthermore, as shown in Table 2, in comparison to the comparative examples, the laminated glass that is obtained by using the laminate for a laminated glass of the present invention was able to provide a long-term inhibition of the variation in the retardation value in a high-temperature atmosphere. In addition, the results in Examples 2 and 5 demonstrated that the use of an adhesive containing acrylic acid as a polymerization component for the adhesive layer formed on the surface of the retardation element made possible an additional inhibition of the long-term variation in the retardation value in a high-temperature atmosphere.

INDUSTRIAL APPLICABILITY

The present invention can provide a laminate for a laminated glass, that exhibits an excellent heat resistance, that exhibits little variation in its retardation value in high-temperature atmospheres, and that can maintain stable optical properties.

The invention claimed is:

1. A laminate for a laminated glass, which comprises an interlayer film for a laminated glass laminated with a retardation element interposed between an adhesive layer A and an adhesive layer B, wherein the retardation element comprises blend of a liquid-crystal compound and at least one compound selected from the group consisting of a compound represented by the following formula (1), a compound represented by the following formula (2), and a compound represented by the following formula (3),

[Formula 1]

(1)

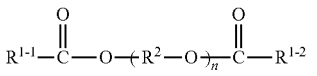

(2)

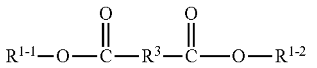

(3)

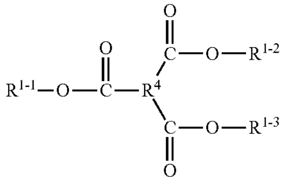

in formula (1), n represents an integer from 3 to 10 and $R^2$ represents a $—CH_2—CH_2—$ group, a $—CH_2—CH(CH_3)—$ group, or a $—CH_2—CH_2—CH_2—$ group;

in formula (2), $R^3$ represents a $—(CH_2)_p—$ group or a phenylene group and p represents an integer from 4 to 8;

in formula (3), $R^4$ presents a substituted phenylene group; and $R^{1-1}$, $R^{1-2}$, and $R^{1-3}$ in formulas (1) to (3) are the same or different, each representing an alkyl group that has a branched structure and that contains at least 5 carbon atoms, wherein the retardation element has excellent heat resistance, exhibits little variation in its retardation value in high-temperature atmospheres, and can maintain stable optical properties wherein the liquid-crystal compound is a polymerizable liquid crystal, and the polymerizable liquid crystal has been polymerized, and wherein the polymerizable liquid crystal is a polymerizable liquid crystal represented by the following formula (4),

[Formula 2]

(4)

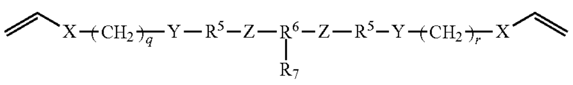

in formula (4), q and r each represent an integer from 1 to 10; X represents —COO— or —O—; Y represents —OC(O)O— or —O—; Z represents —COO or —OCO—; $R^5$ represents a phenylene group; $R^6$ represents a substituted phenylene group, a substituted biphenylene group, or a fluorenyl group; $R^7$ represents —H, $—(CH_2)_w—CH_3$ or $—COO—(CH_2)_w—CH_3$; and w represents an integer from 0 to 11.

2. The laminate for a laminated glass according to claim 1, wherein the compound represented by formula (1) is triethylene glycol di-2-ethylhexanoate, tetraethylene glycol di-2-ethylhexanoate, triethylene glycol di-2-ethylbutyrate, tetraethylene glycol di-2-ethylbutyrate, pentaethylene glycol di-2-ethylhexanoate, octaethylene glycol di-2-ethylhexanoate, nonaethylene glycol di-2-ethylhexanoate, or decaethylene glycol di-2-ethylhexanoate.

3. The laminate for a laminated glass according to claim 1, wherein the compound represented by formula (2) is bis(2-ethylhexyl) adipate, bis(2-ethylbutyl) adipate, bis(2-ethylhexyl) azelate, bis(2-ethylbutyl) azelate, di-2-ethylhexyl sebacate, di-2-ethylbutyl sebacate, di-2-ethylhexyl phthalate, or di-2-ethylbutyl phthalate.

4. The laminate for a laminated glass according to claim 1, wherein the compound represented by formula (3) is tri-2-ethylhexyl trimellitate or tri-2-ethylbutyl trimellitate.

5. The laminate for a laminated glass according to claim 1, wherein the content of the at least one compound selected from the group consisting of the compound represented by formula (1), the compound represented by formula (2), and the compound represented by formula (3), is 0.1 to 300 parts by weight per 100 parts by weight of the liquid-crystal compound.

6. The laminate for a laminated glass according to claim 1, wherein the interlayer film for a laminated glass comprises a thermoplastic resin.

7. The laminate for a laminated glass according to claim 6, wherein the interlayer film for a laminated glass further comprises an ultraviolet absorber.

8. The laminate for a laminated glass according to claim 1, wherein the interlayer film for a laminated glass comprises a polyvinyl acetal resin and a plasticizer.

9. The laminate for a laminated glass according to claim 8, wherein the plasticizer is at least one compound selected from the group consisting of the compound represented by formula (1), the compound represented by formula (2), and the compound represented by formula (3).

* * * * *